Oct. 26, 1954          J. F. CORCORAN          2,692,804
LUBRICANT RESERVOIR FOR RAILWAY CAR TRUCK JOURNALS
Filed May 31, 1951
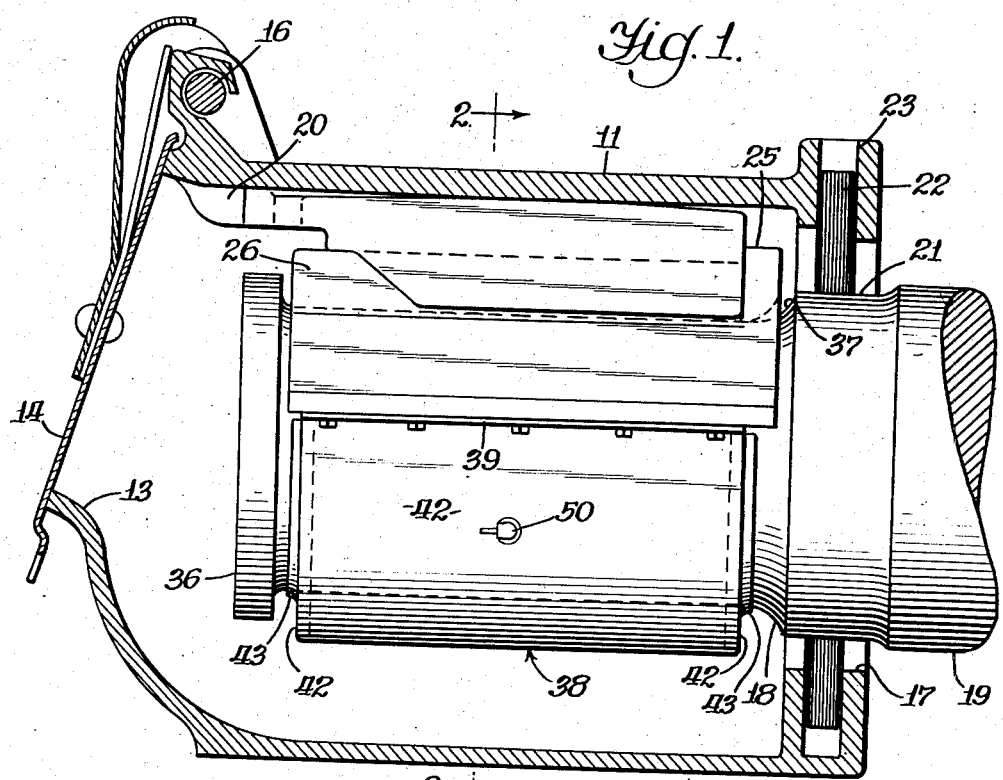
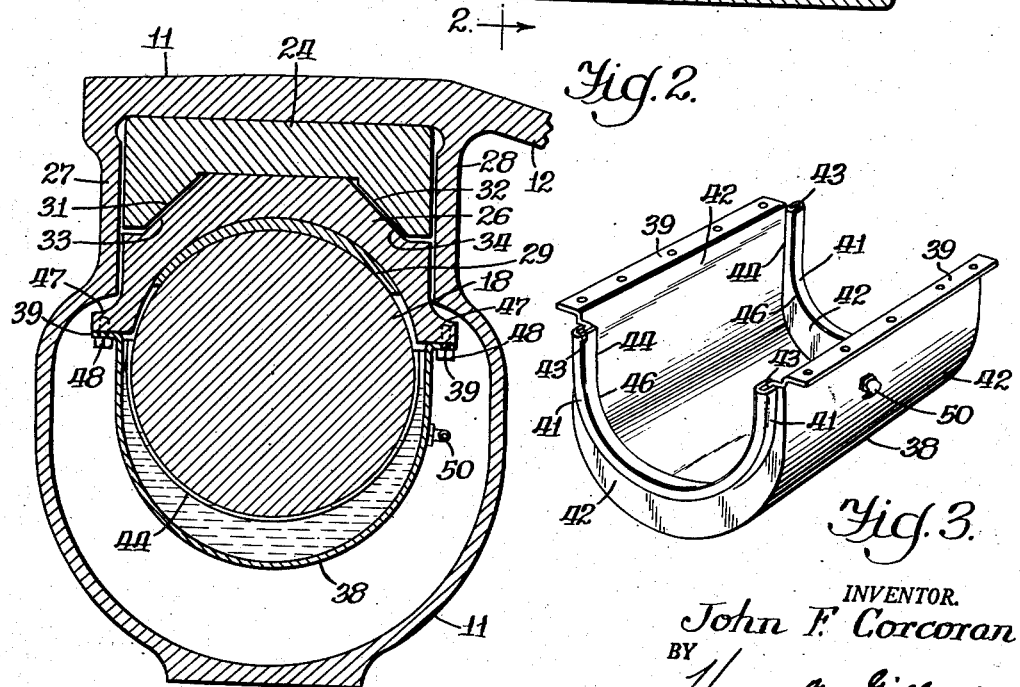
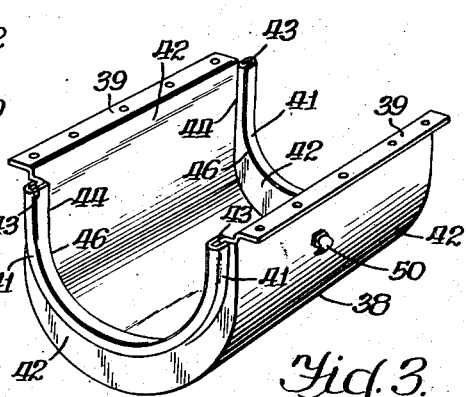
INVENTOR.
John F. Corcoran
BY
Harvey M. Gillespie
Atty.

Patented Oct. 26, 1954

2,692,804

UNITED STATES PATENT OFFICE 2,692,804

LUBRICANT RESERVOIR FOR RAILWAY CAR TRUCK JOURNALS

John F. Corcoran, Bethesda, Md.

Application May 31, 1951, Serial No. 229,239

3 Claims. (Cl. 308—83)

This invention relates generally to improvements in devices for lubricating the journal bearings of a railway car truck, and relates particularly to an improved device for maintaining lubricant against a railway car truck journal without the use of the usual journal box packing.

Modern high-speed railway operation with the use of conventional equipment has posed many problems incident to the proper lubrication of the car truck journals, and at high speeds the conventional packing material for journal boxes has been inadequate to maintain proper lubrication of the journal bearings. Conventional journal boxes have been characterized by the use of dust guards associated with the dust guard bearing of the journal for preventing the ingress of dirt and foreign material to the journal box. Irrespective of the type of dust guard employed, a certain amount of dirt has entered the journal box, and its presence has caused the oil-soaked packing material to become contaminated and cause glazing thereof, thereby preventing the lubricant from reaching the axle journal, with consequent development of hot boxes which damage the journal, the bearing brass and its liner.

According to the present invention the journal is maintained in contact with a supply of lubricant held in a reservoir secured in any convenient fashion to the journal brass. The reservoir is further characterized by sealing means formed as a sector of a circle and embracing a central angle of approximately 180°, whereby the sealing ring and its support on the reservoir may together with the ends of the journal brass completely enclose the axle journal to prevent the ingress of foreign material to the lubricant and also prevent the escape of lubricant therefrom. The reservoir is further characterized by being so constructed that the walls of the reservoir are relatively rigid, being formed of metal or other rigid material, and so that the upper margins of the reservoir can be bolted or otherwise secured to the underside of the journal brass. The reservoir is preferably, though not necessarily, in the form of a stamping or unitary casting having end walls provided with arcuate lips formed thereon to furnish a support for sealing members adapted to contact the axle journal to prevent the escape of lubricant.

With the foregoing considerations in mind it is a principal object of this invention to provide a lubricant retaining reservoir which can be readily inserted into a journal box to maintain a supply of lubricant in contact with the journal at all times, and which can be readily secured to a slightly modified form of journal brass, the journal brass and the reservoir together preventing the escape of lubricant away from the journal bearing.

Another object is to provide a simple and cheap lubricant reservoir for a car axle journal, said reservoir being in the form of a rigid trough or container surrounding the lower portion of a car axle journal and being provided with a simple sealing arrangement which together with the journal brass completely surrounds the journal and forms a positive means of providing lubrication for the axle journal.

Still another object is to maintain the axle journal completely lubricated at all times, and to provide for the lubrication thereof at all times with only a slight amount of modification of the conventional journal brass, which in the case of the instant invention is employed as a support for a lubricant retaining reservoir depending therefrom, and which together with the lubricant retaining reservoir maintains the axle journal substantially sealed at all times against the escape of lubricant or the ingress of foreign material.

Other objects and important features of the invention will be apparent from a study of the within specification, which specification taken together with the drawing discloses a preferred embodiment of the invention, and what is now considered to be the best manner of applying the principles thereof. While the invention is described in terms of what is now considered to be a preferred embodiment thereof, its scope is not intended to be limited by the embodiment shown nor otherwise than by the spirit and scope of the subjoined claims.

In the drawing:

Figure 1 is a longitudinal section through a conventional journal box of a railway car truck, showing a lubricant retaining reservoir constructed in accordance with the present invention;

Figure 2 is a transverse section taken along the line 2—2 of Figure 1 and looking in the direction of the arrows; and Figure 3 is a perspective view, drawn on a smaller scale, of the lubricant retaining reservoir shown in Figures 1 and 2.

Referring now to the drawing, the lubricant retaining reservoir, according to the present invention, is shown as supported within a journal box 11 of a railway car truck. The form of construction of the journal box 11 is unimportant as respects the present invention and may be of any conventional type, and may be of the type which is cast integrally with a side frame 12 of a railway car truck. The journal box 11 is formed with an end opening 13, for inspection of the interior thereof, and is suitably closed by a journal box cover or lid 14 which is hinged at 16 to the top of the journal box 11.

The journal box 11 herein shown is also provided with a circular opening for receiving an axle journal 18 of a wheel axle 19. As shown, the axle journal 18 extends into the journal box 11. A dust guard bearing 21 is formed between the axle journal 18 and the wheel axle 19, and is fitted with a dust guard 22 inserted into a dust guard seat 23 formed in the journal box 11.

The load of the railway car is transmitted by the car bolster, not shown, through the side frame 12 and the journal box 11 onto the journal 18. A journal bearing 26 and an associated wedge 24 are interposed between the journal 18 and the top of the journal box. As seen in Figure 1 the wedge 24 is positioned between a shoulder 29 formed inside the journal box near the top of the opening 13 thereto, and a shoulder 25 formed on the upper side of the brass bearing 26 at a point where the bearing 26 is closest to the dust guard bearing 21. As seen also in Figure 2, the wedge 24 is positioned between shoulders 27 and 28 formed integrally with the journal box 11 and defining side walls thereof. As seen with respect to Figure 2, the journal bearing 26 has a liner 29 of babbitt or other bearing metal which rests upon the journal 18. The bearing element 26 is located properly with respect to the wedge 24 by wedge surfaces 31 and 32 formed on the underside of the wedge 24 which match respectively with wedge surfaces 33 and 34 formed on the upper side of the bearing element 26.

The bearing element 26 is limited in its endwise movement on the journal 18 by a collar 36 integral with the outer end of the journal 18 and a curved shoulder 37 formed between the journal 18 and the dust guard bearing 21.

The structure thus far described is substantially that to be found in the conventional form of railway car journal box. In such conventional construction, the bottom of the journal box is packed with oil-soaked absorbent material which is positioned to the underside of the journal 18, so that upon rotation of the journal a film of oil is carried thereby to lubricate the co-acting surfaces of the journal 18 and the bearing liner 29. The present invention, however, eliminates any possibility that the journal 18 and the bearing liner 29 may not be adequately supplied with lubricant by maintaining a body of lubricant in direct contact with the lower portion of the journal.

According to the present invention the journal bearing or brass 26 may be adapted suitably to provide a support for a lubricant retaining reservoir which underlies the brass 26, and which maintains a supply of lubricant against the journal 18 at all times. As seen in Figures 2 and 3, the lubricant retaining reservoir is generally indicated at 38 to define a substantially semi-cylindrical housing. It is illustrated herein in the form of a unitary metal stamping. However, it may be constructed in other manners and with other materials such as hard rubber or plastics of such character as to maintain the walls relatively rigid. In the forming operation a pair of flat flanges 39, 39 are struck out from the generally semi-cylindrical sides and bottom 41 of the reservoir 38. A pair of end walls 42 may likewise be so formed with substantially end ribs or flanges 43. Each rib 43 is fitted with a seal 44 made of neoprene or other oil-resistant elastomer having inturned lips 46 which are normally compressed against the journal 18 and possesses sufficient resilience to maintain its contact with the journal when the bearing liner 29 becomes worn.

The brass 24 is suitably adapted to suspend the reservoir 38 therefrom to enclose the journal 18 with the supply of lubricant held by the reservoir 38 against the underside of the journal 18. To this end the brass 24 is provided with flanges 47 extending axially of the journal 18 and milled smooth on the underside thereof. The flanges 39 of the reservoir are held against the flanges 47 of the brass 24 by cap bolts 48 threaded into the flanges 47 at a plurality of points therealong.

A pressure lubricant fitting 50 is held to the wall 42 of the reservoir 38, and lubricant is introduced to the journal 18 and brass 26 when the reservoir 38 is in position as seen in the several figures.

In assembling the lubricant reservoir according to the present invention within the journal box 11, the side frame 12 together with the journal box 11 is supported by jacks, not shown, with the journal 18 extending within the journal box 11. It may be assumed that the conventional wedge and the journal bearing will be removed at this time to facilitate insertion of the reservoir 38 through the opening 13 of the journal box, the reservoir being turned to a position 180° from the position as seen in Figure 3. The reservoir 38 is then turned about the journal 18 and permitted to rest on the bottom of the journal box 11 with the flanges 39 of the reservoir 38 in the position as seen in Figure 3, but within the journal box 11. The journal bearing 26 and the wedge 24 are fitted on top of the journal 18 in the usual manner, with the flanges 47 of the bearing 26 extending horizontally as seen in Figure 2. The flanges 39 of the reservoir 38 are then brought against the underside of the flanges 47 and the flanges 39 are then bolted to the flanges 47 by the cap bolts 48. The seals 46 thus contact the journal 18 and seal the reservoir against the escape of lubricant. Lubricant is then introduced into the reservoir 38 by any suitable means connected to the fitting 50, and the proper amount of lubricant to be introduced to the journal bearing may be appropriately metered if desired.

It will be seen from the foregoing description that the invention described herein provides a novel and useful device for maintaining lubrication of the car truck journals at all times. The lubricant retaining reservoir according to the present invention also prevents ingress of dirt or foreign material to the lubricant, thereby avoiding any possibility of injuring the journal brass liner. By the use of the device according to the present invention the need for oil-soaked waste packing of the journal boxes is made entirely unnecessary. Furthermore, the conventional journal structure needs to be modified but slightly only, by forming flanges on the journal brass for securing the lubricant reservoir thereto.

While the invention has been described in terms of a certain embodiment thereof, it is not intended that the invention be limited in terms of the embodiment shown nor otherwise than by the terms of the appended claims.

I claim:
1. In combination with a railway car axle journal provided with spaced apart circumferential shoulders encircling the journal and defining a smooth bearing surface between them, a journal bearing supported on said journal in spaced relation to said circumferential shoulders so as to permit substantial axial movement of the bearing relative to the journal, and a journal box enclosing said journal and journal bearing and provided with a front opening through which said bearing is normally applied to its operative position, of means for supplying lubricant to said journal and to the journal bearing comprising a reservoir insertable through the front opening of the journal box and enclosed therein at a location underlying the journal and removably secured to the journal bearing, the said reservoir being of trough configuration for containing a body of lubricant and including relatively thin but rigid side and end walls which cooperate with said bearing to completely enclose a major portion of said smooth bearing surface of the journal, and resilient sealing elements fitted to the edge portion of each end wall of the reservoir and engaging said smooth bearing surface of said journal for providing a sealed connection between the said journal and the end walls of said reservoir.

2. The combination structure as defined in claim 1 characterized in that the said circumferential shoulders encircling the journal constitute thrust bearings at opposite ends of said smooth surface for limiting axial movement of the bearing relative to the journal and in that the overall length of the lubricant reservoir is less than the overall length of the journal bearing and the ends of the said reservoir are spaced inwardly from the ends of said journal bearing whereby the ends of the reservoir remain clear of said thrust shoulders when the journal bearing is in engagement with said shoulders.

3. The combination structure as defined in claim 2 characterized in that the resilient sealing elements are connected to said end walls and bear resiliently against said smooth surface of the journal to provide seal connections between the journal and both end walls of the reservoir.

References Cited in the file of this patent
UNITED STATES PATENTS

| Number | Name | Date |
|---|---|---|
| 64,064 | Bond | Apr. 23, 1867 |
| 560,486 | Eisele | May 19, 1896 |
| 803,159 | Finley | Oct. 31, 1905 |
| 1,510,377 | Blose | Sept. 30, 1924 |
| 1,885,586 | Bryan | Nov. 1, 1932 |
| 1,906,840 | Coady | May 2, 1933 |
| 2,259,648 | Lucas | Oct. 21, 1941 |
| 2,480,486 | Leazer | Aug. 30, 1949 |